Figure 1:
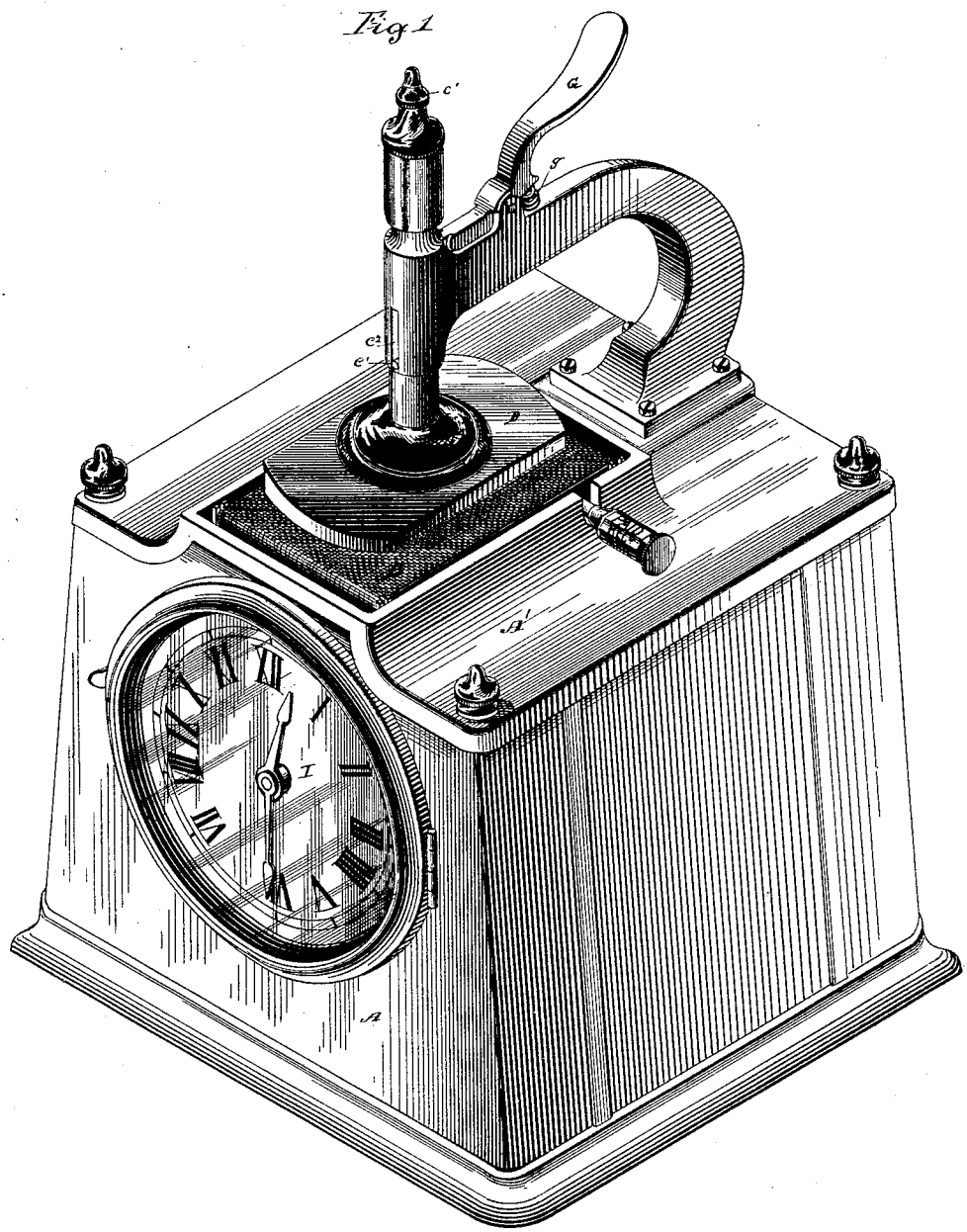

(No Model.)  7 Sheets—Sheet 1.
P. G. GIROUD.
AUTOMATIC TIME STAMP.

No. 452,428. Patented May 19, 1891.

WITNESSES:
Edwin L Bradford
Wm M Stockbridge

INVENTOR
Peter G. Giroud
BY
G. W. Stockbridge
his ATTORNEY.

(No Model.)

7 Sheets—Sheet 2.

P. G. GIROUD.
AUTOMATIC TIME STAMP.

No. 452,428.  Patented May 19, 1891.

WITNESSES:
Edwin L. Bradford
Wm M. Stockbridge

INVENTOR
Peter G. Giroud
BY
G. N. Stockbridge
his ATTORNEY.

(No Model.)  P. G. GIROUD.  7 Sheets—Sheet 3.
AUTOMATIC TIME STAMP.

No. 452,428.  Patented May 19, 1891.

WITNESSES:
Edwin L. Bradford
Wm M Stockbridge

INVENTOR
Peter G. Giroud
BY
G. N. Stockbridge
his ATTORNEY.

(No Model.) 7 Sheets—Sheet 4.
P. G. GIROUD.
AUTOMATIC TIME STAMP.
No. 452,428. Patented May 19, 1891.
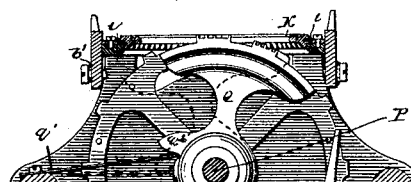
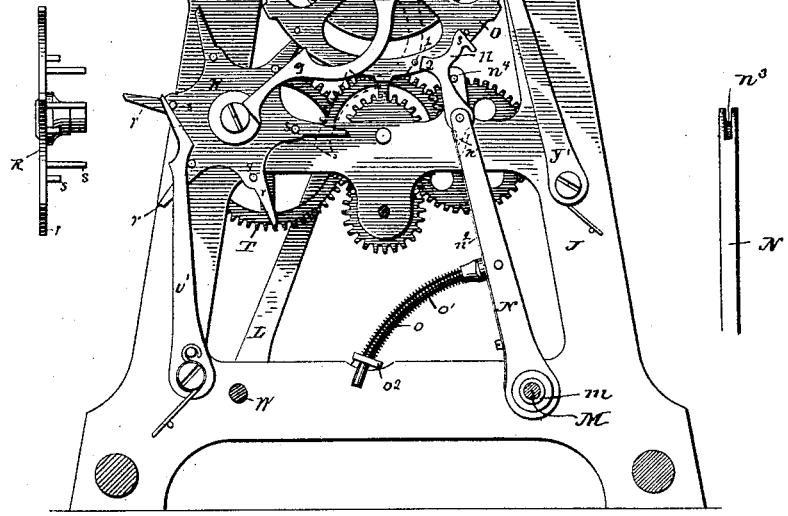
WITNESSES:
Edwin L. Bradford
Wm. Stockbridge
INVENTOR
Peter G. Giroud.
BY
G. H. Stockbridge
his ATTORNEY.

(No Model.)  7 Sheets—Sheet 5.
P. G. GIROUD.
AUTOMATIC TIME STAMP.

No. 452,428. Patented May 19, 1891.

WITNESSES:
Edwin L. Bradford
Wm. M. Stockbridge

INVENTOR
Peter G. Giroud
BY
G. N. Stockbridge
his ATTORNEY.

(No Model.) 7 Sheets—Sheet 6.
P. G. GIROUD.
AUTOMATIC TIME STAMP.
No. 452,428. Patented May 19, 1891.
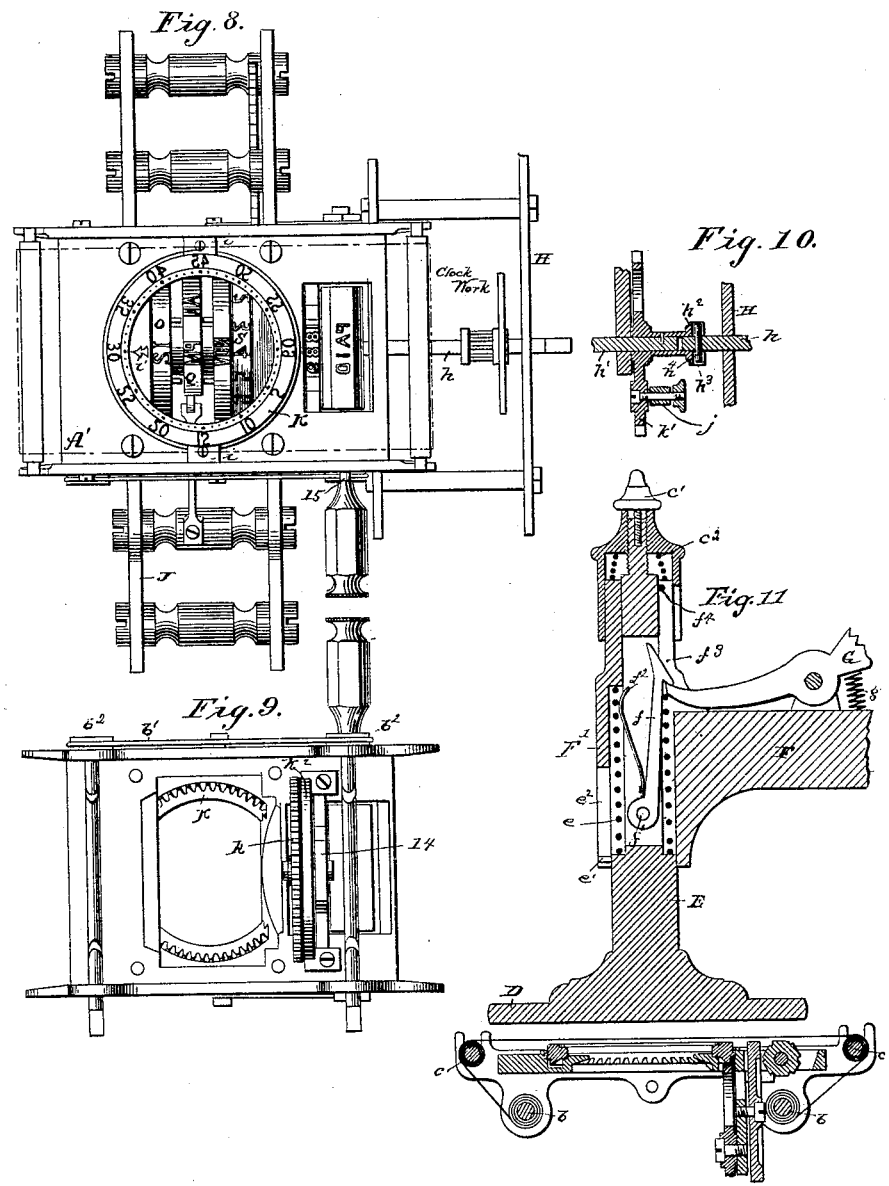
WITNESSES:
Edwin L. Bradford
Wm M. Stockbridge
INVENTOR
Peter G. Giroud
BY G. H. Stockbridge
his ATTORNEY.

(No Model.)   P. G. GIROUD.   7 Sheets—Sheet 7.
AUTOMATIC TIME STAMP.
No. 452,428.   Patented May 19, 1891.
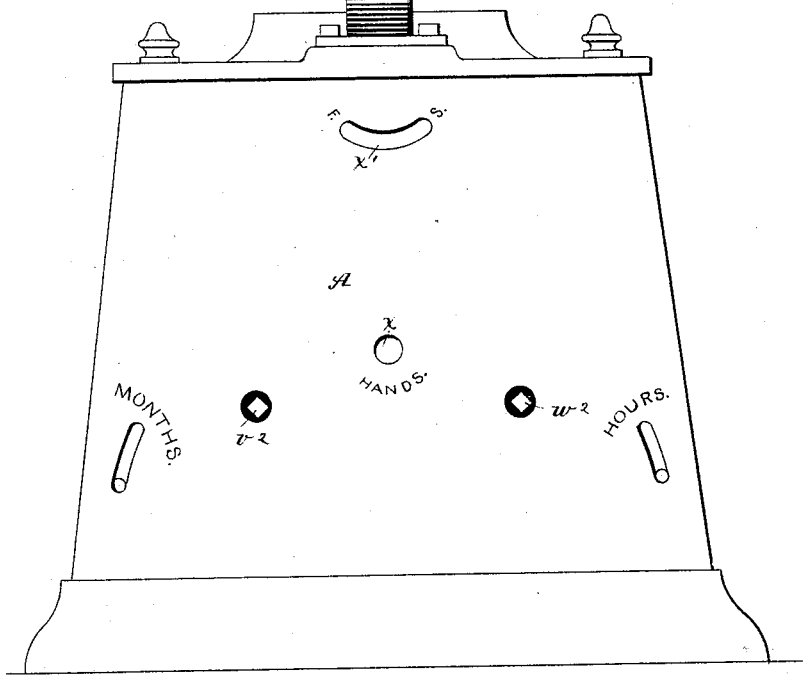
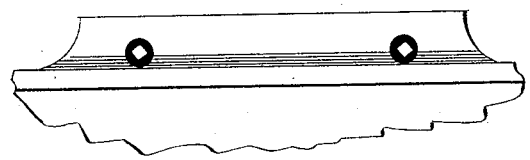
WITNESSES:   INVENTOR
Edwin L. Bradford   Peter G. Giroud.
Wm M Stockbridge   BY G. N. Stockbridge
   his ATTORNEY.

UNITED STATES PATENT OFFICE.

PETER G. GIROUD, OF BROOKLYN, NEW YORK, ASSIGNOR OF THREE-FIFTHS TO FRANK B. COLTON, OF NEWARK, NEW JERSEY.

AUTOMATIC TIME-STAMP.

SPECIFICATION forming part of Letters Patent No. 452,428, dated May 19, 1891.

Application filed November 18, 1889. Serial No. 330,713. (No model.)

*To all whom it may concern:*

Be it known that I, PETER G. GIROUD, a citizen of the United States, and a resident of Brooklyn, in the county of Kings and State of New York, have invented certain new and useful Improvements in Automatic Time-Stamps, of which the following is a specification.

My invention is concerned with improvements in automatic time-stamps, and is designed to remedy some of the defects of apparatus of that class by simplifying the structure and improving the action. In the first place I have constructed my improved apparatus with a view to compactness, and am able to put my stamp into a smaller compass than has heretofore been possible with stamps of equal capacity. In the second place I have so arranged and constructed my indicating-wheels and the mechanism for operating them that their successive movements are accomplished with certainty and regularity and with little frictional resistance. For this last reason I am able to use clock mechanism of small power, thereby reducing the cost of the apparatus. In the third place I have constructed my stamping apparatus in such a way that the operation of taking the impression does not disturb the working of the indicating-wheels nor the accuracy or efficiency of the clock mechanism. In stamping apparatus as ordinarily constructed such disturbance is common and constitutes a serious defect, as it tends either to injure permanently the apparatus or to bind it temporarily and so interfere with its accuracy.

In carrying out my invention I have also had regard at every point for improving the freedom and sureness of operation and relieving the apparatus from the known defects of its class without complicating the structure. The details of these improvements will be given hereinafter.

I combine with my stamping apparatus a time-indicator, the machinery of which controls also the automatic stamp. The two mechanisms are in complete unison, and by regulating the time-piece according to standard time the whole apparatus can be kept in order. As most of the matter to be printed is arranged on the peripheries of moving wheels, and the movements of the said wheels are in a vertical plane, I can easily make an ordinary clock-work drive the combined devices by straight connections. In practice I select a common cheap clock-movement and I join its center arbor to the center arbor of my time-stamping apparatus end to end by a slot-and-pin connection. The characters which indicate the minutes are arranged on a horizontal dial, which is operated by a wheel of sixty teeth which engages with the same number of crown-teeth on the bottom of the dial. The latter is mounted in and on a removable plate, which forms the top of the inclosing case of my apparatus and also constitutes the printing-bed. Within and near the edge of the dial is a fixed index showing the point at which the reading is to be taken. Within an opening in the movable dial appear the peripheries of the indicating-wheels, one of which carries in type the successive numbers from 1 to 12 for indicating the hours of the day. This makes a step-by-step movement each hour, and a complete rotation once in twelve hours. Another of the wheels has characters from 1 to 31, which indicate the days of the month. This makes a partial rotation every twenty-four hours and a complete rotation every thirty-one days. In my present apparatus I have taken thirty-one days as the month-unit, and when there are less than that number of days in a given month the apparatus can be moved forward by hand, provision for doing which without removing the casing is made. Still another wheel is marked with abbreviations, twelve in number, of the names of the months in order. This moves one step after every thirty-first movement of the preceding wheel and rotates completely once a year. My meridian apparatus, which is located with the described wheels, is not a complete wheel itself, but is a segment marked with the characters "A. M." and "P. M.," and caused to oscillate back and forth every time the apparatus is brought to the point of indicating twelve o'clock. After each movement every wheel is held in place by a dead-lock, as will appear. Either within the minute-dial, or, as I have shown it, outside the same, is a year-wheel operated by hand. I illustrate also other hand-indicating devices, all of which, together with the apparatus which operates the automatic devices, will be fully described in the specification which follows.

My invention is illustrated in the accompanying drawings, in which—

Figure 2:
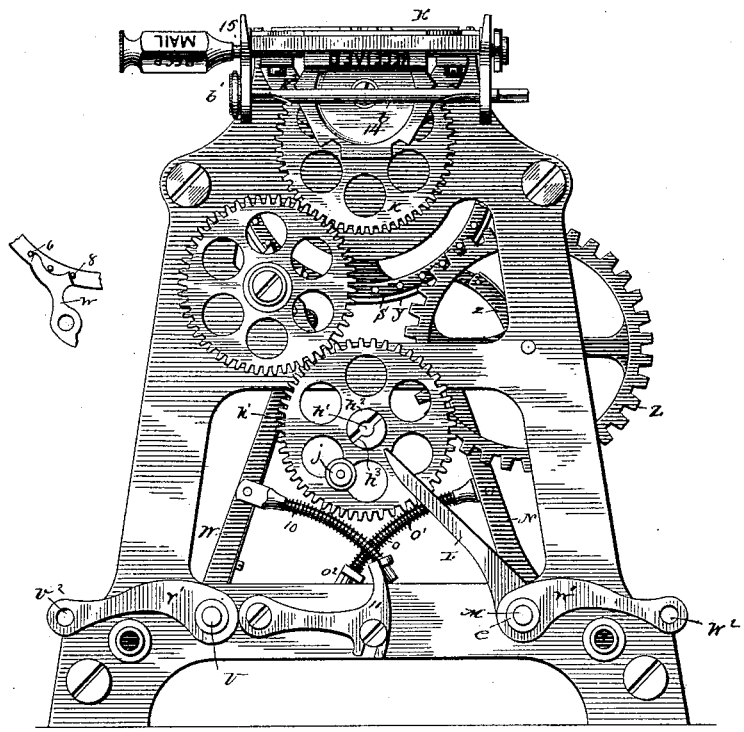
Figure 3:
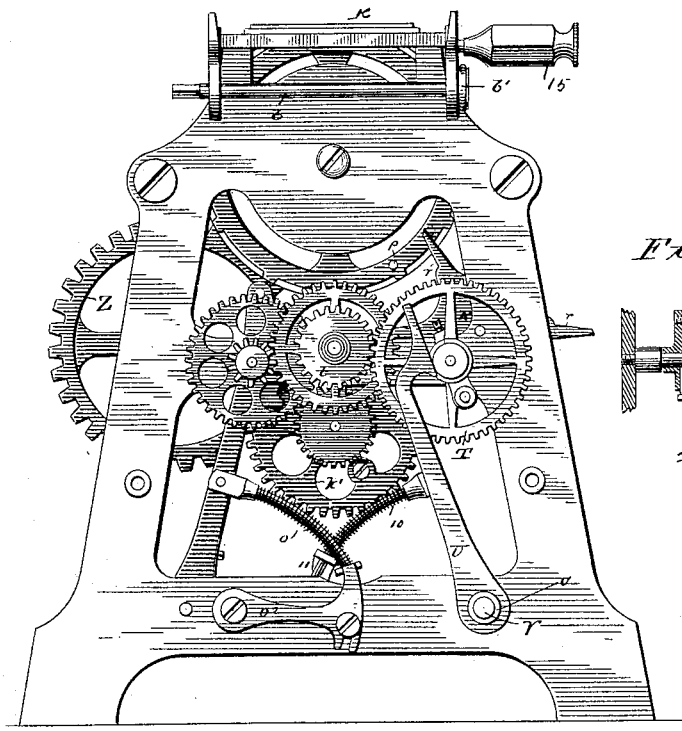
Figure 4:
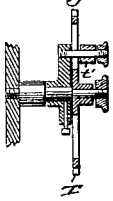
Figure 7:
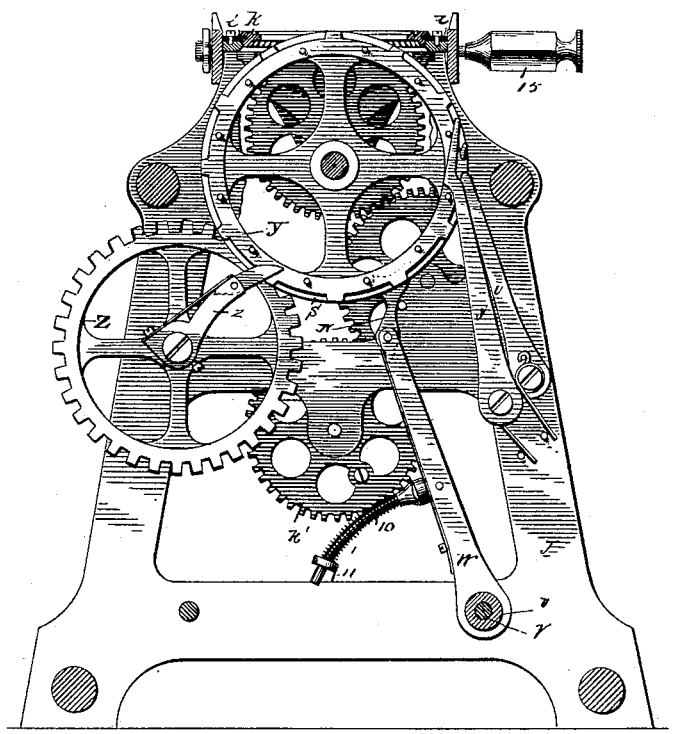

Figure 1 is a perspective of my automatic time-stamp. Figs. 2 and 3 are respectively a rear and a front elevation of the stamp mechanism. Fig. 4 is a detail view. Fig. 5 is a vertical section of the stamp mechanism, looking from rear to front. Fig. 6 is a detail. Fig. 7 is a vertical section similar to Fig. 5, but taken from the opposite direction. Fig. 8 is a plan of the entire apparatus with the casing removed. Fig. 9 is a bottom view of the removable top. Fig. 10 illustrates the connection between the time-clock and the central shaft of the stamp mechanism. Fig. 11 is a vertical section through the plunger and the top plate, and Fig. 12 is a rear elevation of the casing.

In the drawings the same letters refer to the same parts throughout.

A is the casing of the entire apparatus, and A' the removable top plate thereof. Characters in type, some on the peripheries of moving wheels and some on a horizontal moving dial or on the stationary part of the plate, project slightly above the surface of the latter, which forms the printing-bed. An ink-ribbon B is wound upon transverse rollers $b$ $b$, and is adapted to be drawn over the characters. The rollers are operated by hand to feed the ribbon and receive the proper tension from the spring $b'$, which bears at each end on hubs $b^2$ $b^2$ on the rollers. The rollers may be operated from the outside of the casing by a suitable key applied to their squared ends. In passing from one roller to the other the ribbon also travels over an independent pair of rollers $c$ $c$ near the ends of the top plates, the tops of which rollers are of the proper height to raise the ribbon slightly above the characters to be printed. Above the ribbon is a platen or printing-pad D, attached to a plunger E, which plays in the head F of a curved arm F', attached to the casing, as clearly shown in Fig. 1.

The structure of this part of the apparatus is novel and will be described in detail. The plunger E, where it passes through the head F', is reduced in size and surrounded above the shoulder thus formed by a coiled spring $e$, which presses at one end against the shoulder and at the other when the plunger is pushed up into place against the top of a chamber formed in the head. A pin $e'$ on the plunger, co-operating with a longitudinal slot $e^2$ in the head, serves to keep the platen properly placed with respect to the printing-bed. When the pad is in the position shown in Fig. 11—that is, slightly above the ink-ribbon—the spring $e$ is under practically no tension. Above the head F' the plunger is again reduced and provided with a screw-thread, with which the top of a cap $c'$ engages. Within the cap is placed a coiled spring $c^2$, which, when the cap is screwed down tight, is under considerable tension, tending to raise the plunger. The spring $e$ is more powerful than $c^2$ and predominates when the two are opposed. Now inside the chamber in the head F' the plunger is cut through longitudinally and a hook $f$, pivoted at $f'$, is inserted. The hook is pressed out by a spring $f^2$. In the rear of the head is a slit $f^3$, in which the hook plays. The top of the slit is closed by a pin $f^4$ or otherwise. On the curved arm F is pivoted a hand-lever G, one end of which extends into the slit and is held under the point of the hook by a spring $g$. The other end of the lever forms a handle by means of which it can be operated.

In case it is desired to actuate the printing-pad it is only necessary to press down on the handle, and thereby lift the plunger through the medium of the other end of the lever and the hook until the latter is released by the pressure of its beveled upper end against the pin $f^4$. This release leaves the plunger under the influence of the stronger spring $e$, which is now under tension and which carries down the printing-pad, so as to press with considerable force against the surface below. The pad and plunger are immediately raised into their normal position, however, by the power of the spring $c^2$. The contact of the printing-pad is therefore momentary, thus removing all danger of deranging the action of the stamp machinery, which danger is always present when the printing-pad is operated by the ordinary hand push-rod. It is understood, of course, that the printing process is accomplished by placing the paper or other substance on which a record is to be made between the printing-pad and the ink-ribbon and then operating the plunger as above set forth.

The clock mechanism which operates the time indicating and stamping devices is located within the casing A, in this instance at the rear, as shown at H. Inasmuch as any suitable clock-work may be employed I have not thought it necessary to illustrate this part of the apparatus in detail. I prefer to use a cheap eight-day movement and to join its center arbor $h$ to the corresponding part $h'$ of the stamp machinery by a slot-and-pin connection. On the end of the arbor $h'$ I secure rigidly a sleeve $h^2$ and provide the sleeve with a central opening large enough to admit the end of the arbor $h$. I also make a slot $h^3$ across the end of the sleeve and put a pin $h^4$ through the arbor $h$, so as to lie in the said slot. Thus the two mechanisms are joined and the two center arbors are practically united into one. The sleeve $h^2$ might be attached to the other arbor, and the other co-operating parts might be reversed with the same results.

Near the forward end of the arbor $h'$ is the usual hour and minute hand gear operating the usual hands in front of the dial-face I.

The gearing of the stamp apparatus is supported by a frame J, consisting of two plates separated by posts. The indicating devices, (most of them,) which this gearing is designed to operate, are located at the top of the frame in such position as to enter and project through an opening in the top plate A' under the ribbon. One of the said devices, however, is in the form of a moving dial K, which has on its under side sixty crown-teeth, which engage with a wheel $k$ of sixty teeth run from a similar wheel $k'$ on the arbor $h'$. The dial K is provided on its upper surface with the characters 5, 10, 15, and so on up to 60, to indicate five-minute spaces, and with intermediate points to show the minutes. It is held in place by a pair of clips $i$ $i$, which enter a groove in the edge of the dial. A pointer $i'$ is fixed to the top plate to show where the reading is to be taken. With this arrangement, which provides for the operation of the engaging parts one tooth a minute, the reading can be made very accurate, certainly to within one-quarter of a minute. In practice I pivot the wheel $k$ to a lug $k^2$ on the bottom of the plate A'. It is apparent from the above that the wheel $k'$ rotates once an hour. Now this wheel carries a little stud, on which is mounted an anti-friction roller $j$. This comes in contact once in each rotation with an arm or lever L on a sleeve $e$, which is screwed to a shaft M. On another sleeve $m$, secured to the same shaft, is an arm N, in an opening in the top of which is pivoted a deer-foot catch $n$, of peculiar construction. A toe $n'$ on the bottom of the catch presses against a spring $n^2$ attached to the arm, whenever it is moved in a direction toward the left in Fig. 5. On the right it is stopped by the shoulder $n^3$ on the body of the arm. The upper end of the deer-foot rests between two successive pins (of which there are twelve in all) on the side of a wheel O on the shaft P. The length and position of the catch are such that it practically locks the wheel from movement in either direction. Now the arm N is normally pressed in a direction toward the right in Fig. 5 by a coiled spring $o$, surrounding a curved rod $o'$, which is attached to the arm and passes through an opening in a bracket $o^2$ on the frame. One end of the spring presses against the bracket and the other against the arm. The curve of the rod corresponds to the curve of motion when the arm descends. When that happens, by the partial rotation of the shaft as the roller $j$ presses on the arm L the toe $n'$ is urged against the spring $n^2$ by the pressure of the upper part of the deer-foot on the pin $l$. Presently, however, the first point of the deer-foot (at 2) slips by this pin, and then the second point 3 passes it. A moment later the roller $j$ passes the point of the arm L, and the parts are moved back by the spring $o$, carrying with them the wheel O the distance of one tooth. Upon this return movement the deer-foot $n$ is kept from turning in the reverse direction by the bearing of its toe $n'$ upon the shoulder $n^3$ in the slot of the arm N, and the stop-pin $n^4$ on a bracket on the frame-piece J limits its bodily movement toward the right. The wheel is locked as before. This action takes place once an hour.

On the periphery of the wheel O are characters from 1 to 12 for indicating the hours of the day. Next to the wheel O on the shaft P is mounted a segment Q, carrying the characters "A. M." and "P. M." The segment has two extreme positions, in one of which A. M. and the other of which P. M. is in line for printing. The reversals take place at twelve o'clock noon and midnight. The means for causing the reversals will now be described. On the front of the wheel O is a pin $p$, which projects into range with the arms $r$ $r$ on a wheel R. This wheel is loosely mounted on a stud projecting from the frame. From the wheel R project inward pins $s$ $s$, which are alternately long and short, for a reason which will presently appear. The position of the pin $p$ on the wheel O is such that it is ready to engage with one of the arms $r$ $r$ when the wheel O is brought to the point of indicating 11 o'clock. This condition continues until the wheel O is given its next partial rotation to 12. At this time the pin $p$ catches and carries the engaging arm $r$ with it, and so gives to the wheel R a partial rotation. Now in the path of the longer of the pins $s$ $s$, but outside the shorter pins, is a tail $q$ of the segment Q. A spring $q'$ taking under a lug $q^2$ on the hub of the segment, holds the tail against one of the pins. In the position illustrated in full lines in Fig. 5 the spring is holding the parts in one extreme position. After the wheel R has been carried one step farther the parts will assume the position illustrated in dotted lines. The two positions are those suited for bringing the proper characters to the top of the segment for printing.

The wheel S is marked with numbers from 1 to 31 for indicating the days of the month, and it is operated one step every twenty-four hours by mechanism which will now be described. On the sleeve which supports the hour-hand is a pinion $t$, engaging with a wheel T, which rotates on a stud projecting from the front of the frame. From this wheel T, which is geared to make a complete rotation once a day, the wheel S is rotated step by step, the connections being substantially the same as those between the wheels $k'$ and O. In this instance the connecting parts are an anti-friction-roller $t'$ on a stud on wheel T, an arm or lever U on a sleeve $u$ on shaft V, sleeve $v$, and arm W, carrying a deer-foot catch $w$. The arm U is slightly different from L, and the deer-foot also has its peculiar construction, but the operation is substantially identical—that is, once in each rotation of the wheel T it forces the arm U back, carrying the shaft V, the arm W, and the deer-foot $w$. The latter is arranged to stand between teeth 6 and 8, being cut away to leave a place for an intermediate tooth, as shown in the detail at the left of Fig. 2. There are thirty-one pins on the wheel S, and it makes a complete rotation after thirty-one operations of the lever U by the wheel T. The release of the lever and the carrying forward of the wheel take place on the passage from "A. M." to "P. M." at midnight. The spring which operates the lever is shown at 10, and the bracket against which it presses at 11. In case any month has less than thirty-one days the wheel S can be operated independently of the clock mechanism by means of an arm $v'$, attached to the shaft V and a rod $V^2$. The latter projects through an opening in the back of the casing, (see Fig. 12,) where it can be easily reached for being operated. A similar group of parts (shown at $w'$ and $w^2$) is attached to the shaft M for operating the hour-wheel independently. Besides these rods other appliances project through the rear casing, one at $x$ for setting the hands of the clock and another at $x'$ for regulating the clock.

It now remains to describe the action of the wheel Y, which is marked with abbreviations of the names of the months, and which is actuated after every thirty-first operation of the wheel S or on the change from "31" to "1" on that wheel. It will be observed that the pins on wheel S, thirty-one in number, engage with a pinion or wheel Z, mounted on the frame. The wheel has thirty-one teeth, corresponding to the number of the pins. On the hub of this wheel is an arm $z$, which is adapted to engage at intervals with pins on the month-wheel. The pins are twelve in number, arranged at equal distances apart. As the wheel S approaches the position where it shows the number "31" at the top, the arm is brought nearer and nearer to one of the pins. When the change from "31" to "1" finally takes place, the arm is carried by a quick movement against one of the pins, moving the wheel one space.

As a still further precaution against the slipping of the wheels, I have provided spring-pressed pawls, which are urged against successive pins on the wheels. In this way the pawl $u$ retains the wheel S, the pawl $y$ the wheel Y, the pawl $u'$ the wheel R, and the pawl $y'$ the wheel O. The tension of the spring 10 is adjusted by loosening the screw 12, which holds the clip 11, and moving the clip up or down and then tightening the screw. A slot in the end of the clip admits of this being done.

On the lug $k^2$ on the top plate A' is mounted a disk 14. This disk carries numbers indicating the years, and is operated by hand. In the same plate is mounted a transverse shaft 15, carrying a sleeve with words in type, such as "Received," "Paid," &c. Outside the plate and within reach of the hand is a sleeve with the same words in the same order. By means of this outside handle the characters inside the top plate can be turned to print any desired word.

Having now described my invention, what I claim is—

1. The combination, with a time-stamp and an arm attached thereto, of an automatic plunger supported by the arm and carrying the printing-pad, a spring-catch attached to the plunger, a manual device for lifting the said plunger through the medium of the catch, and a positive release for the said catch, as and for the purpose set forth.

2. An attachment for time-stamps, consisting of an arm, an automatic plunger supported thereby and carrying the printing-pad, a spring-catch attached to the plunger, a manual device engaging with the catch to lift the plunger, and a positive release for the said catch, as and for the purpose set forth.

3. The combination, with an automatic time-stamp and an arm attached thereto, of an automatic plunger supported by the arm and carrying the printing-pad, a catch on the said plunger, and a spring-pressed lever engaging with the catch, as and for the purpose set forth.

4. The combination, with a time-stamp, of a curved arm, an automatic plunger supported thereby and carrying the impression-pad, a spring holding the plunger and pad slightly above the printing-bed, a second spring resisting the upward movement of the plunger, a spring-catch attached to the plunger, a manual device for engaging the said catch, and a release for the catch, as and for the purpose set forth.

5. An automatic plunger for time-stamps, carrying the impression-pad, a spring holding the plunger and pad slightly above the printing-bed, a second spring resisting the upward movement of the plunger, in combination with a spring-catch attached to the plunger, a manual device for engaging with the catch, and a release for the said catch, as and for the purpose set forth.

6. In a time-stamp, an indicating-wheel, a series of pins on the same, a catch or pawl engaging with the pins, the said catch or pawl being supported on a spring-actuated lever, a gear-wheel having a pin outside its center on which is mounted an anti-friction roller, the pin and roller forming an eccentric which intermittently actuates the said lever against the force of the spring to move the catch behind a succeeding pin, whereby when the lever is released it will carry the indicating-wheel one step forward, as set forth.

7. An indicating-wheel having pins projecting therefrom, a deer-foot catch or pawl the ends of which catch between two succeeding teeth, so as to lock the same, the said catch having a spring-pressed toe, the spring tending normally to hold the catch in engagement with the pins, as set forth.

8. The combination, with the meridian segment having a tail or extension, of a wheel having alternately longer and shorter projections co-operating with the said tail or extension, a pawl applied to the said wheels, and automatic devices for operating the said wheel, as set forth.

9. The combination, with the meridian segment having a tail or extension, and with the hour-wheel, of a wheel operated intermittantly by the latter, and a pawl applied thereto, the said last-named wheel being provided with alternately longer and shorter projections, the said tail or extension being in the path of motion of the longer projection, but outside the path of motion of the shorter projection, and being urged by a spring against the longer projections, as and for the purpose set forth.

10. The combination, with a lever, of a spring co-operating therewith, the spring being coiled around a rod which is attached to the lever and has the curve of the lever's motion, the outer end of the rod passing through an adjustable pivoted clip, whose adjustment takes place on the same curve, as set forth.

11. In a time-stamp, the combination, with a horizontal indicating-dial mounted in a horizontal bed, of a groove in the edge of the dial, and two or more clips which enter the groove, as and for the purpose set forth.

In testimony that I claim the foregoing as my invention I have signed my name, in presence of two witnesses, this 14th day of November, 1889.

PETER G. GIROUD.

Witnesses:
H. W. HELFER,
G. H. STOCKBRIDGE.